(12) United States Patent
Lynggaard

(10) Patent No.: US 7,418,160 B2
(45) Date of Patent: Aug. 26, 2008

(54) METHOD AND DEVICE FOR PROCESSING OF INFORMATION

(75) Inventor: Stefan Lynggaard, Lund (SE)

(73) Assignee: Anoto AB, Lund (SE)

( * ) Notice: Subject to any disclaimer, the term of this patent is extended or adjusted under 35 U.S.C. 154(b) by 663 days.

(21) Appl. No.: 10/251,795

(22) Filed: Sep. 23, 2002

(65) Prior Publication Data

US 2003/0077004 A1     Apr. 24, 2003

Related U.S. Application Data

(60) Provisional application No. 60/324,257, filed on Sep. 25, 2001.

(30) Foreign Application Priority Data

Sep. 21, 2001   (SE) ................................ 0103178

(51) Int. Cl.
*G06K 9/22* (2006.01)
(52) U.S. Cl. ................ 382/313; 382/314; 382/315; 382/188; 382/116
(58) Field of Classification Search .......... 382/312, 382/313, 314, 315, 316, 317, 319, 321, 188, 382/116, 322, 323, 280, 112, 141; 341/89; 705/64, 67; 345/173, 156; 707/1, 200; 235/491, 235/494, 462.01, 454, 487, 472.01, 472
See application file for complete search history.

(56) References Cited

U.S. PATENT DOCUMENTS 4,759,071 A * 7/1988 Heide ................. 381/317

(Continued)

FOREIGN PATENT DOCUMENTS

WO     WO01/16691 A1    3/2001

(Continued)

OTHER PUBLICATIONS

Dymetman, Marc and Max Copperman, "Intelligent Paper", Xerox Research Centre Europe, pp. 392-406, XP-002328425.

*Primary Examiner*—Matthew C. Bella
*Assistant Examiner*—Ali A. B Bayat
(74) *Attorney, Agent, or Firm*—Birch, Stewart, Kolasch & Birch, LLP

(57) ABSTRACT

Device for processing of information, which device comprises a processor and, connected to the processor, a reading unit for electronic reading of information on a surface, which is provided with a position code which codes a plurality of positions on the surface. The device reads the position code, associates a position code for coded positions within a value area defined on the surface with values in a set of values which includes a plurality of values, and initiates the generation of a control signal whose level is related to a value associated with a read-off position code. Method for processing of position data obtained from said surface. According to the method, the position code is read for a coded position which lies within the value area; the value in the set of values which is associated with the read-off coded position is determined; and the generation of a control signal is initiated, the level of which control signal is related to the determined value. Computer program for processing of position data in accordance with the method, and a product which comprises a surface of the above-mentioned type. Elected for publication: FIG. 1.

36 Claims, 4 Drawing Sheets

U.S. PATENT DOCUMENTS

| | | |
|---|---|---|
| 5,661,506 A | 8/1997 | Lazzouni et al. |
| 5,852,434 A | 12/1998 | Sekendur |
| 6,211,858 B1 * | 4/2001 | Moon et al. ................. 715/771 |
| 6,493,002 B1 * | 12/2002 | Christensen ................ 715/779 |
| 6,502,756 B1 * | 1/2003 | Fåhraeus .................... 235/494 |
| 6,594,406 B1 | 7/2003 | Hecht |
| 6,868,283 B1 * | 3/2005 | Bonansea et al. ........... 455/566 |
| 6,906,699 B1 * | 6/2005 | Fåhraeus et al. ............ 345/157 |
| 2001/0028344 A1 * | 10/2001 | Iwamoto et al. ............. 345/175 |
| 2002/0026425 A1 * | 2/2002 | Fahraeus .................... 705/64 |
| 2002/0079371 A1 * | 6/2002 | Bobrow et al. .............. 235/454 |
| 2005/0253743 A1 * | 11/2005 | Sahlberg et al. ............... 341/89 |
| 2005/0278254 A1 * | 12/2005 | Silverbrook et al. .......... 705/51 |
| 2007/0014490 A1 * | 1/2007 | Silverbrook et al. ........ 382/313 |

FOREIGN PATENT DOCUMENTS

| | | |
|---|---|---|
| WO | WO01/48591 A1 | 7/2001 |
| WO | WO01/48678 A1 | 7/2001 |
| WO | WO01/48685 A1 | 7/2001 |
| WO | WO01/61449 A2 | 8/2001 |
| WO | WO01/75779 A1 | 10/2001 |

* cited by examiner

METHOD AND DEVICE FOR PROCESSING OF INFORMATION

This application claims priority on provisional Application No. 60/324,257 filed on Sep. 25, 2001, the entire contents of which are hereby incorporated by reference.

FIELD OF INVENTION

The present invention relates to a method and a device for processing if information coupled to a position code on a surface, the position code coding a plurality of positions on the surface. The invention also relates to a computer program for processing of position data and to a product with a surface of the above-mentioned type.

PRIOR ART

Techniques for providing a surface with a position code, and various applications of the surface provided with the position code, are known per se, for example from the Patent publication WO 01/16691 which is hereby incorporated in the present specification by reference. The underlying idea is that it is possible to provide a surface with a position code, which codes a large number of positions on the surface, and to read the code with a special device which also can be used as a conventional pen. When a user writes with the pen, the device electronically records the position of the pen all the time.

The position data generated in this way can be used in a great many ways, for example to permit reproduction of the text or drawn images, etc., which the user creates on a display such as a computer screen. Another possibility which is that of providing the surface with at least one activation icon which causes the recording device to initiate a predetermined operation which utilizes the information recorded by the device. Examples of such operations are sending e-mail, with text which is part of the information, entering calendar information which is part of the information in an electronic calendar, etc.

However, the use of the activation icon is limited because of the single value information which it contains.

SUMMARY OF THE INVENTION

The object of the invention is to develop the usability of an area with information.

According to one aspect of the invention, the object is achieved with a device for processing of information, which device comprises a processor and a reading unit for electronic reading of information on a surface, which is provided with a position code which codes a plurality of positions on the surface, the device being adapted to read the position code by means of the reading unit. The device is adapted to associate, by means of the processor, a position code for coded positions within a value area defined on the surface with values in a set of values which includes a plurality of values, and to initiate the generation of a control signal whose level is related to a value associated with a read-off position code.

According to another aspect of the invention, the object is achieved with a method for processing of position data obtained from a surface which is provided with a position code which codes a plurality of positions on the surface, and which surface comprises a value area, the position code for coded positions within a value area defined on the surface being associated with values in a set of values which includes a plurality of values. The method comprises the steps of reading the position code for a current coded position which lies within the value area;

determining the value in the set of values which is associated with the read-off coded position; and initiating the generation of a control signal whose level is related to the determined value.

In accordance with the invention, it is therefore possible to obtain a value area which contains value-added information and to use the multiple information to effect active control. The control can, for example, be effected on the device itself or an external device.

According to one embodiment of the device and method, the control signal is used for multiple-state indication, said indication being controlled by the level of the control signal. In other words, the indicator indicates one of a plurality of states depending on which level the control signal has. Since the level is in turn related to the set of values which includes a plurality of values, for example more than two, this opens up several possibilities of indicating levels both of internal phenomena in the device and of external phenomena relative to the device, as will be explained in more detail below.

In accordance with the invention, it is thus possible to convey relatively complex information to the user using only a single indicator which can occupy one of two or more states. The complexity is created by the values with which the coded positions are associated. According to one embodiment of the device, the user can find out about internal states of the device. These can include battery voltage, available memory, etc. The set of values then represents a scale, i.e. a range, of values, and an expedient selection of the values which are spread across the range can be indicated on the surface in connection with, i.e. in or adjacent to, the value area. When the device is moved across the value area, and thus along the scale, the indicator changes state just when the current value is passed. The user can read off the current value at the place where the device is situated at that instant or estimate the value with the aid of values which are indicated in proximity to the location.

Another advantage of the invention finds expression in embodiments where the control signal is used for setting functions of the device or of other devices, the level of the control signal determining the setting. For example, signal-processing functions, such as the degree of compression for data storage, can be set in the device, and on an external device it would be possible, for example, to set the sound volume, running time, etc.

BRIEF DESCRIPTION OF THE DRAWINGS

Further objects, features and advantages of the invention will become appearent from the following detailed description of the invention and embodiments thereof with reference to the accompanying drawings, in which.

DETAILED DESCRIPTION OF EMBODIMENTS OF THE INVENTION

Figure 1:
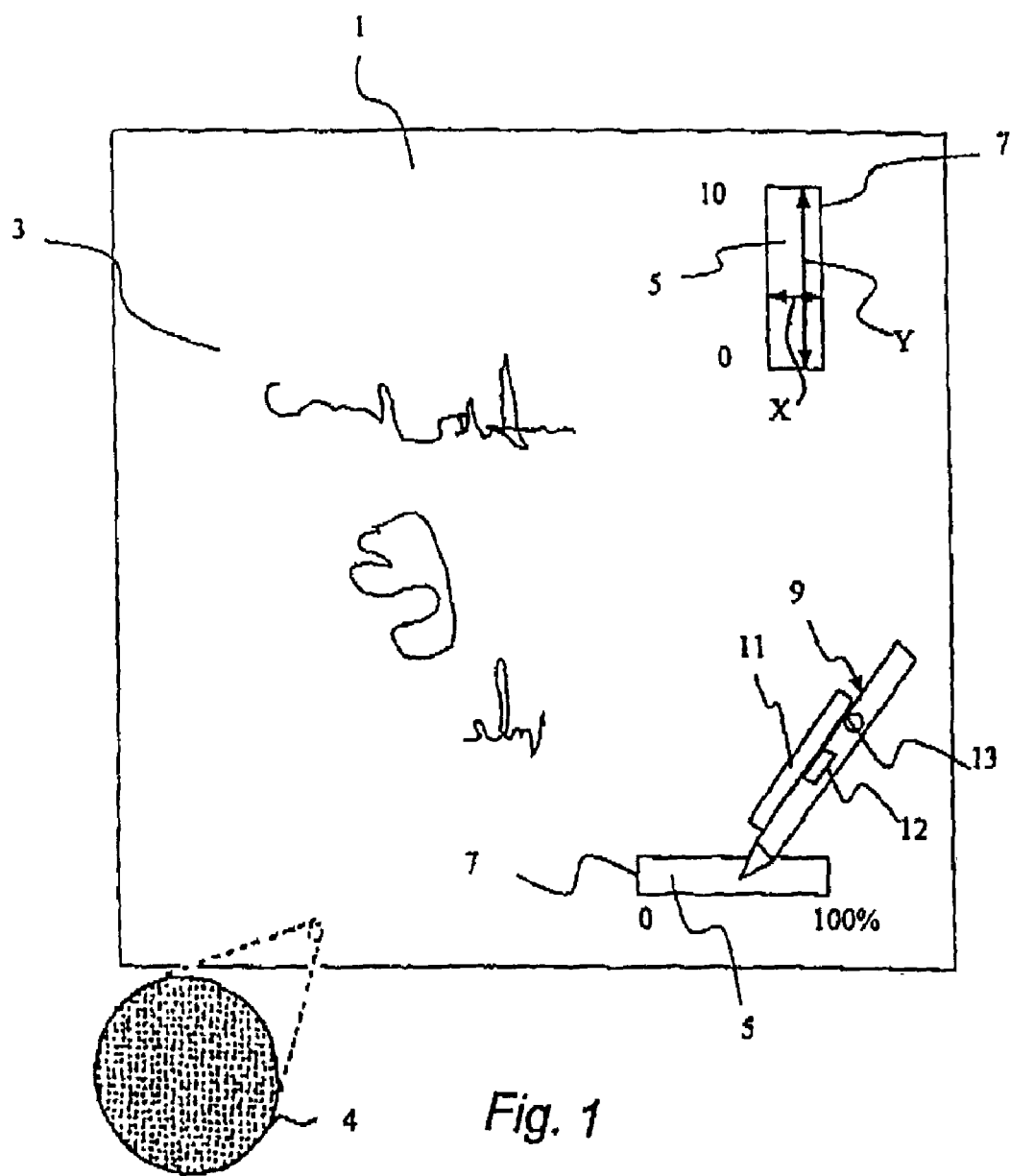
FIG. 1 is a schematic view showing an embodiment of the device according to the invention and an example of a surface.

FIG. 1 discloses a product in the form of a sheet of paper 1 with a surface 3. At least part of the surface is printable/writable and at least part of the surface is provided with a position code in the form of, for example, a dot pattern of the type which is described in WO 01/16691 and is illustrated in an enlarged area at 4 in FIG. 1. The dots are displaced in relation to a virtual raster in such a way that different positions on the surface are coded uniquely. The geometry of the dot pattern is designed such that a good resolution is obtained. It should be noted that, for reasons of clarity, the dot pattern is not shown other than in the enlarged area.

Several value areas 5 are defined on the surface 3. In this embodiment, they are marked by indications, i.e. printed/written markings 7, as is shown in a very schematic way in FIG. 1 and illustrated in more detail in FIG. 2, so that a user can see them.

In this embodiment, the surface 3 is writable and a device 9 for processing of information, which device is designed as a pen, is used for writing on the surface. The pen 9 is provided with a reading unit 11, for example a camera, which reads the position of the pen 9 on the surface, and a processor 12 which is connected to the reading unit 11 and which is adapted to store and analyze data generated by the reading unit 11. In other words, the reading unit 11 reads the position code, i.e. the dot pattern, and generates data which thus includes position information, which data is processed by the processor 12.

It is appreciated that the pen 9 includes a memory unit and a battery even though this is not shown. The pen 9 also has an indicator 13. In the embodiment shown, the indicator 13 is a light-emitting diode which can emit light in several different colors, among others red, green and blue. However, the simplest variant is an indicator with two states, such as on/off or green/red or blinking/steady-state. Other examples of indicators are ones which generate sound or generate vibrations.

Associated with each value area 5 there is a set of values. The set of values contains a plurality of values which can relate to many different factors. Each position in a value area 5 is associated with a value in the set of values. The value area 5 may have an extent in two directions, as is illustrated in FIG. 1 by the arrows X and Y.

Figure 2A:
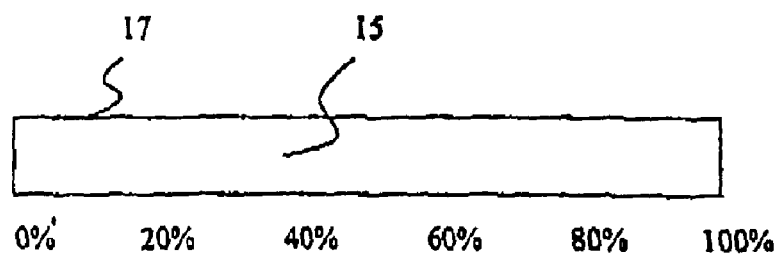
FIG. 2 is a schematic view showing different variants of value areas.

FIG. 2a shows a case where the value area 15 is rectangular, its borders being shown by a rectangle 17, and the values in one direction are identical, whereas the values in the other direction range across an interval with the lowest value at one end of the area 15 and the highest value at the other end of the area 15. The values represent one of several conceivable types of information. In the example shown, the type of information represents information concerning a property of the pen 9, more specifically 0-100 percent of the battery charge of the battery of the pen 9. Some values (0, 20, 40, 60, 80 and 100 percent) are printed close to the value area 15 on the surface and more specifically alongside the value area 15. Now assume, by way of example, that the battery has 60% of its power remaining. Via a charge sensor, the processor 12 receives data concerning the current battery charge. When a user places the tip of the pen 9 at one end of the value area 15 which represents the value 0 percent, the reading unit 11 reads the current position on the surface. The processor 12 analyzes position data from the reading unit 11, compares it with pre-programmed information concerning the extent of the value area 15, confirms that the current position lies within the value area 15, and, as a result of this, generates an indication. More specifically, the processor generates a control signal with a first level which corresponds to the current position lying above or below the current charge. The control signal activates the indicator 13 so that it is set to a first active state in which it generates a green light. When the pen 9 is moved towards the other end of the value area 15, the indicator 13 continues to show a green light until the position for 60% is passed, whereupon the processor changes the level of the control signal to a second level which sets the indicator to a second active state in which it generates a red light. If the pen 9 is moved back, the indicator 13 reverts to green. The user can establish where the change-over takes place and can read the value 60% at the change-over position. It is of course immaterial where the pen 9 is situated along the second direction of the value area 15, i.e. vertically in FIG. 2a, since the positions which lie one after the other in this direction are associated with the same value.

There are many other conceivable internal properties which can be illustrated in a corresponding manner. For example, the available storage capacity of the memory can be shown. If the pen includes a container with writing fluid, for example ink, the container can be provided with a sensor which generates a level value and sends it to the processor 12. Thus, a value area can be used to show how much of the container is filled.

Just as the value area can be used to give the user information, as has been described above, it can be used to give the user the possibility of setting functions of the pen 9. One example is where the level of the control signal corresponds to the degree of compression for storing information in the pen's memory. In this example, a value area is used which in fact represents the degree of compression, and the user can select the degree of compression by placing the pen at a corresponding position in the value area.

Figure 2B:
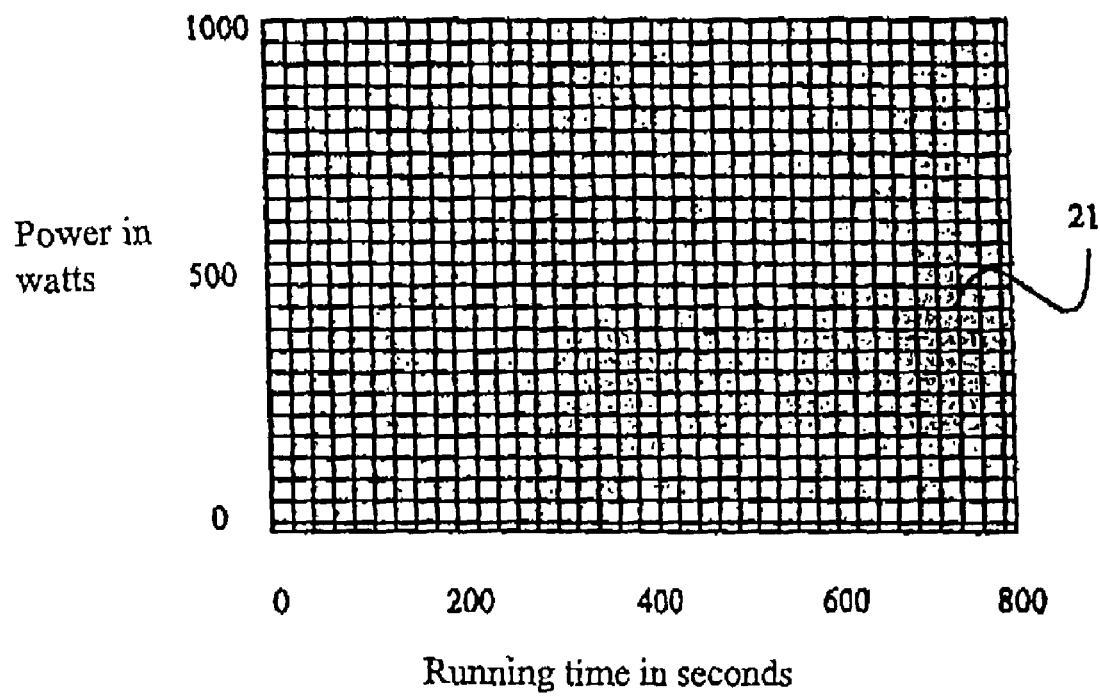
Figure 4:
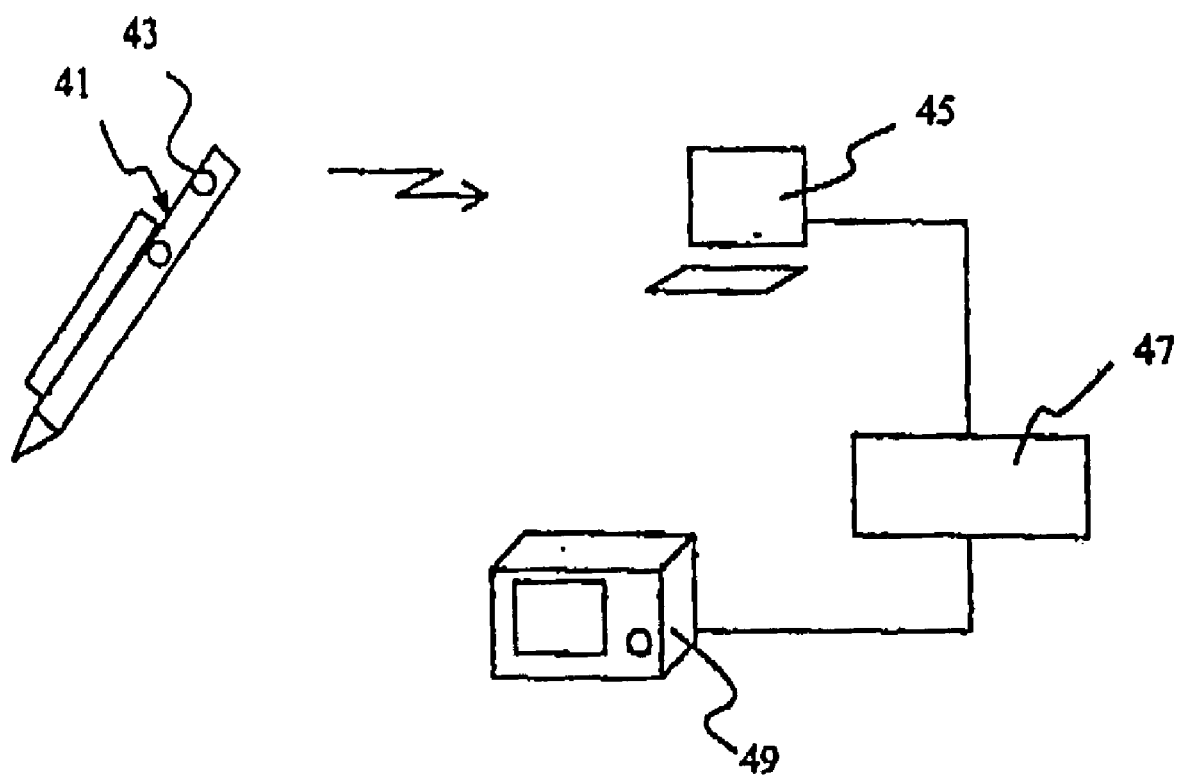
FIG. 4 is a schematic view showing another embodiment of the device according to the invention and its communication with a second device.
Figure 5:
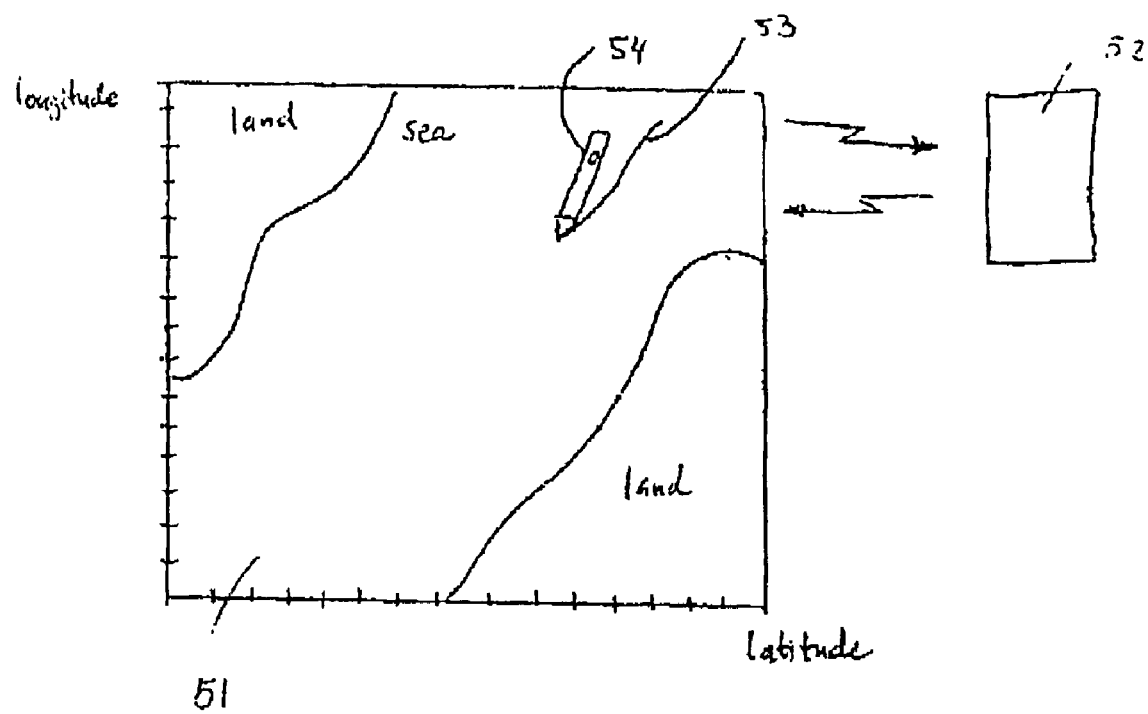
FIG. 5 is a schematic view showing another embodiment of the device according to the invention and its communication with a second device.

FIG. 2b shows a value area 21 where the positions are associated with different values in both directions. Each coded position is thus associated with a value which comprises two parts, namely information on power and information on running time. The value area 21 shows data for an external device, more specifically a microwave oven 49 (see FIG. 4) which can thus be controlled from the surface 3. In this case, the pen 41 does not generate an actual control signal but it still initiates the generation of a control signal by sending information, in this case position data for the current position, via a personal computer PC 45 to a server 47. The server 47 interprets the position data, coupling the position data to values in the set of values concerning the power and running time of the microwave oven 49, and it generates and sends corresponding control data to the microwave oven 49. The microwave oven 49 finally sets the power and running time indicated in the value area 21 with the aid of the received control data.

For this application, the pen 41 is provided with a transceiver 43. The transceiver 43 can either be connected for wired communication or for wireless communication. In other words, the pen 41 is adapted to forward position data for the read-off position by wired communication, or by wireless communication by short-distance radio, to another device which is typically reached either via a PC or via a mobile telephone. The second device can often be a server on which information concerning value areas and sets of values coupled to positions is stored.

The principle by which the pen 41 communicates with another device is described, for example, in Patent publications WO 01/48678, WO 01/48591 and WO 01/48685. In the wireless configuration, in addition to radio, IR light and ultra-sound are also conceivable techniques for the transmission.

Instead of representing absolute values, such as the power and running time as above, or values which are relative with respect to a highest value, as the percentages above, it is possible for the values in the set of values to be relative with respect to an existing level. One example is the setting of the sound volume of an internal acoustic indicator or of an external acoustic installation, where one part of the value area and the associated set of values represents an increase of the existing sound volume, and the other part represents a decrease. Another example is the setting/adjustment of the above-mentioned degree of compression for storing information in the memory of the pen 9, where different parts of the set of values can represent increasing or decreasing of the degree of compression, which is then done for example by setting the level of the control signal high or low as a function of the current value.

The pen can also be adapted to detect a direction of movement when it is moved across a value area. In the example just described, with relative values in relation to a previously set level, one application of the movement detection is where the pen movement in one direction in the value area represents an increase in the level, whereas a movement in the other direction represents a decrease in the level. The detection of movement can be achieved, for example, by the pen storing a sequence of a plurality of positions which the pen passes without being lifted, and the direction of movement is determined with the aid of the position sequence.

Figure 3:
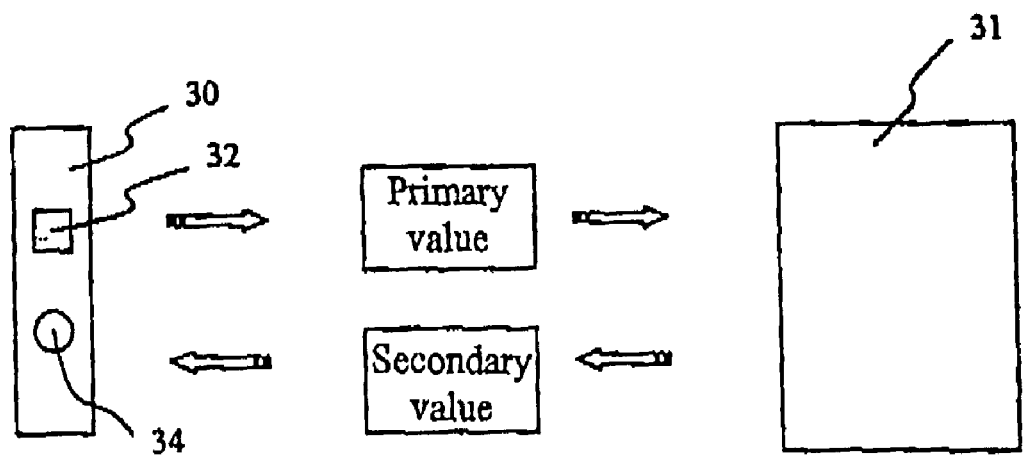
FIG. 3 is a schematic view showing information exchange between the device according to the invention and a second device.

FIG. 3 shows another embodiment of the pen designated 30. When the pen 30 can exchange information with another device, such as a server 31, via the transceiver 32, it is possible to use the indicator 34 also to indicate states and properties which are not associated with the pen 30 itself. In other words, the value area can represent information types concerning information on such other states and properties. The pen 30 then sends primary information, in the form of a value associated with a position and consisting of position data for a read-off position code, to the server 31 which processes the received primary information, by coupling position data to a value in a set of values for the current value area, and sends back secondary information, which in turn is used to generate a control signal which activates the indicator 34.

One example of this variant is a share price calculator. The surface is provided with a number of value areas, for example four, which represent ranges of share prices for four different companies. The ranges are indicated on the surface. The value areas each have their own identity number, or ID number, for example 1, 2, 3 and 4. The share prices are stored on a server which is reached via the Internet. When the user wishes to find the share price for company 1, for example, he places the pen in the value area with ID number 1. The pen then connects to the server and sends the ID number. The server has information on the range of share prices for the value area with ID number 1 and on the current share price. The server determines a percentage which indicates where in the range, in percentage terms (0-100%), the current share price lies, and it returns the percentage to the pen. The pen's processor knows the extent of the value area on the surface and can therefore determine the change-over position within the value area, i.e. within the range of share prices. The pen reads its position and selects a signal from the position. Now assume, for example, that the range is SEK 20-60 and that the current price is SEK 42. The percentage is then 55%. Now assume that the pen is at 53% of the range, i.e. of the extent of the value area. The pen shows green. The user moves the pen to 65%. The pen shows red. When the user has found the change-over position at 55%, the price of SEK 42 can be read at the position on the surface.

Thus, the actual value in the set of values can be determined either in the pen 9, 30, 41 or in another device, such as a server.

In the last-mentioned case, it is purely the position information that is forwarded to another device, in accordance with the example above. However, the information which is sent to the other device can also be a variant of or an addition to the position data, such as the above-described identity number, for the value area in which the current position lies. In this case, information on the ID number and on the extent of all the value areas has been stored in advance in the pen.

It is also possible to conceive of applications in which there is no representation of any value in the value area and/or in which the value area is not visibly marked on the surface.

One example of this variant is a sea navigator. The surface 51 is provided with a nautical chart of a certain area. There could be many different nautical charts covering different areas. Each nautical chart has its own ID number. The x-axis represent latitude and the y-axis represent longitude. The latitude values and the longitude values are indicated on the surface. Information of the depths in the nautical chart is stored on a server 52 which is reached via the Internet. When the user wishes to find out whether the sea is deep enough for his boat along a route he intends to sail he places the pen on the nautical chart along the route 53. The pen then connects to the server and sends the position data for the read-off position and the ID number of the nautical chart. The server has information on the current depth of the sea associated with the read-off position and sends the information to the pen. The current depth of the users boat has been stored in the pen in advance. The processor analyzes position data from the pen, compares it with received information about the depth of the sea, confirms whether the depth of sea on the current position is deeper than the boat, and, as a result of this, generates a control signal which activates the indicator 54. For example, the indicator may show a green light when the sea is deeper than the boat and a red light if the boat is deeper than the sea.

At least parts of the processing of read-off position data may be carried out under the control of a computer program which is input into the pen's memory and which is executed by the processor. The computer program can also be made available on another storage medium, such as a diskette. Examples of a stepped sequence formulated with executable instructions are the steps of establishing that the position code for a read-off coded position lies within the value area; determining the value in the set of values which is associated with the read-off coded position; and initiating the generation of a control signal whose level is related to the determined value. The software is easy to update or to replace all or some of the software stored in the pen as and when required and as a function of how the pen is to be used.

The above description of embodiments does not constitute a limiting example of how the invention can be realized. Many modifications are possible within the scope of the invention as it is defined in the appended claims. The invention is only limited by the appended patent claims.

What I claim and desire to secure by Letters Patent is:

1. A device for processing information obtained by reading a position code from a surface containing the position code and human readable markings identifying at least one value area associated with an internal functional capacity of a physical component of the device, the position code coding a plurality of positions on the surface, the device comprising:
   a processor; and
   a camera configured to read the position code from the surface, and to generate positions based thereon;
   wherein the processor is configured to associate each said coded position within the at least one value area with a value belonging to a class of values representing a range of said internal functional capacity of said physical component of the device, and to initiate generation of a control signal having a level which is related to a value associated with a read position code from within the value area.

2. The device as claimed in claim 1, further comprising a multiple-state indicator, the indication of which is controlled by the level of the control signal.

3. The device as claimed in claim 1, in which the processor is adapted to control a function in the device by means of the control signal.

4. The device as claimed in claim 1, in which the processor is adapted to generate the control signal.

5. The device as claimed in claim 1, further comprising a transceiver for sending said value associated with a position to an external device and for receiving a secondary value from the external device, the control signal being generated on the basis of the secondary value.

6. The device as claimed in claim 1, in which the value area has an extent in two directions, the values in one direction being different and the values in the other direction being different.

7. A device for processing information obtained by reading a position code from a surface containing the position code and human readable markings identifying at least one value area, the position code coding a plurality of positions on the surface, and the value area to be used for providing information about a parameter associated with an internal functional capacity of a physical component of the device, the device comprising:

a multiple-state indicator a camera configured to read the position code from the surface, and to generate read positions based thereon;

a processor configured to associate positions read from within the value area with values in a scale of values representing a range of said internal functional capactiy of said physical component of the device, and to initiate generation of a control signal for the multiple-state indicator, the control signal representing said parameter and having a signal level related to a value associated with the read position; and wherein the multiple-state indicator is configured to indicate, based on the control signal, states which are related to the scale of values.

8. The device as claimed in claim 7, in which the scale represents relative values.

9. The device as claimed in claim 8, in which the values are relative in relation to a pre-set level.

10. A system for processing information obtained by reading a position code that codes a plurality of positions on a surface, the surface including, in addition to the position code, human-readable markings defining a value area to be used for providing information about a parameter associated with an internal functional capacity of a physical component of a handheld device contained within the system, comprising:

a camera configured to electronically read the position code from the surface and to generate positions based thereon; and a processor configured to associate positions coded by the position code within the value area with values in a scale of values representing a range of said internal functional capacity of said physical component of the handheld device, and to initiate generation of a control signal for a feedback unit, the control signal representing said parameter and having a signal level related to the value associated with the generated position.

11. The system of claim 10, wherein the, camera, the processor and the feedback unit are contained within a hand held device.

12. The system of claim 10 wherein the internal functional capacity comprises at least one of a battery charge of a battery within the handheld device, a storage capacity of a memory unit in the handheld device, and a level of writing fluid in a fluid container in the handheld device.

13. The system of claim 10, wherein the camera is contained within a hand held device; and the handheld device further comprises a communication unit for transmitting the generated positions to an external device containing the processor.

14. The system of claim 13, wherein the feedback unit is contained in the handheld device.

15. The system of claim 10, wherein the feedback unit comprises a multiple-state indicator.

16. The system of claim 10, wherein the scale represents absolute values.

17. The system of claim 10, wherein the scale represents relative values.

18. The system of claim 10, in which the values are relative to a pre-set level.

19. The system of claim 10, wherein the processor is further configured to associate the positions coded within the value area with the parameter, such that the parameter is identifiable from the generated position.

20. The system of claim 10, wherein the signal level represents the value associated with the generated position in relation to a current value of the parameter.

21. The system of claim 20, wherein the processor is configured to generate the control signal with a first signal level when the generated position corresponds to a scale value below the current value of the parameter and with a second signal level when the generated position corresponds to a scale value above the current value of the parameter.

22. A self-contained handheld device for processing information obtained by reading positions from a surface, the surface including a position code that codes a plurality of positions and at least one value area defined by human readable markings, the value area being associated with an internal functional capacity of a physical component of the handheld device, the device comprising:

a camera configured to electronically read the position code on the surface and to generate a position based thereon; and a processor configured to associate positions read from within the value area with values in a scale of values representing a range of said internal functional capacity of said physical component of the handheld device, and to initiate generation of a control signal for an internal function of the handheld device based on the value associated with the generated position.

23. The handheld device of claim 22, wherein the control signal is generated with a signal level related to the value associated with the generated position.

24. The handheld device of claim 22, wherein the control signal is generated to set a current value of said internal functional capacity of said physical component of the handheld device.

25. The handheld device of claim 24, wherein the internal functional capacity is included in the group comprising: a degree of compression for data storage in a memory unit in the handheld device, and a sound volume of an acoustic indicator in the handheld device.

26. The handheld device of claim 22, wherein the control signal is generated to operate a feedback unit to indicate a current value of said internal functional capacity of said physical component of the hand held device.

27. The handheld device of claim 26, wherein the feedback unit is contained in the handheld device.

28. The handheld device of claim 27, wherein the control signal is generated with a first signal level when the generated position corresponds to a scale value below the current value of the internal capacity and with a second signal level when the generated position corresponds to a scale value above the current value of the internal capacity.

29. The handheld device of claim 26, wherein the control signal is generated with a signal level that represents the value associated with the generated position in relation to a current value of the internal capacity.

30. The handheld device of claim 26, wherein the feedback unit comprises a multiple-state indicator.

31. The handheld device of claim 26, wherein the internal capacity comprises at least one of a battery charge of a battery in the handheld device, a storage capacity of a memory unit in the handheld device, and a level of writing fluid in a container in the hand held device.

32. The handheld device of claim 26, wherein the processor is further configured to associate the positions coded within the value area with the internal capacity, such that the internal capacity is identifiable from the generated position.

33. The handheld device of claim 22, wherein the scale represents absolute values.

34. The handheld device of claim 22, wherein the scale represents relative values.

35. The handheld device of claim 22, in which the values are relative to a pre-set level.

36. The handheld device of claim 22, wherein the processor is configured to detect a direction of movement of the camera within the value area based on a plurality of generated positions, and to selectively increase or decrease the signal level of the control signal based on the thus-detected direction of movement.

* * * * *